United States Patent [19]
Westenberg

[11] Patent Number: 5,618,024
[45] Date of Patent: Apr. 8, 1997

[54] SLIDE VALVE

[76] Inventor: Martin Westenberg, Tramstrasse 29, CH-4132 Muttenz, Schweiz, Germany

[21] Appl. No.: 515,220

[22] Filed: Aug. 15, 1995

Related U.S. Application Data

[63] Continuation of Ser. No. 298,573, Aug. 31, 1994, abandoned.

[30] Foreign Application Priority Data

Sep. 3, 1993 [DE] Germany .................... 43 29 856.7

[51] Int. Cl.$^6$ .................................................. F16K 3/20
[52] U.S. Cl. ........................................ 251/159; 251/172
[58] Field of Search ................................. 251/159, 172

[56] References Cited

U.S. PATENT DOCUMENTS

| | | | |
|---|---|---|---|
| 3,445,087 | 5/1969 | Priese et al. | 251/172 |
| 3,642,248 | 2/1972 | Benware | 251/172 |
| 4,137,935 | 2/1979 | Snowdon | 251/172 X |
| 4,145,026 | 3/1979 | Chronister | 251/159 X |
| 4,776,564 | 10/1988 | Westenberg | 251/172 |

Primary Examiner—John C. Fox
Attorney, Agent, or Firm—Anthony J. Casella; Gerald E. Hespos

[57] ABSTRACT

A slide valve for pipelines for the transporting of slide-laden gaseous or liquid fluids comprises a slide-valve housing within which a displaceable closure member rests in closing position with its closure surface against an inflated annular packing (66). The annular packing (66) is developed with a circumferential hollow space (82) which is in communication with a connection (78) for a source of pressure. An annular support spring (84) is arranged within the hollow space (82). The spring supports the annular packing (66) in its uninflated starting position, and rests in supporting manner for this purpose with its vertex region directed towards the closure surface of the closure member against the inner circumference of the hollow space (82) of the pressure-relieved, undeformed annular packing (66) which is inserted in the slide-valve housing and rests on all sides against its supporting walls.

9 Claims, 3 Drawing Sheets

SLIDE VALVE

This application is a continuation of Ser. No. 08/298,573 filed Aug. 31, 1994, now abandoned.

BACKGROUND OF THE INVENTION

1. Field of the Invention

The present invention relates to a slide valve for pipelines for the transporting of solid-laden gaseous or liquid fluids.

2. Description of the Prior Art

A slide valve is known from Applicant's DE 36 06 236 A1. Upon the protracted operation of such known slide valves, it has been found that particles of solid of a particle size of up to about 100μ can emerge past the annular packing, through the connection of the source of pressure and penetrate into the relief valve, disturbing its operation and making it inoperable. Even placing the annular packing into the slide-valve housing with the use of a highly effective adhesive has not been able, in the long run, to prevent the passage of such solid particles at the annular packing; rather, the more effective the adhesive, the greater the danger of the annular packing itself breaking.

The object of the present invention is to improve a slide valve in such a manner that, even upon protracted operation, the passage of even very fine solids past the annular packing into the connection of the source of pressure is dependably avoided without expensive additional work for a particularly effective bonding of the annular packing being necessary for this.

SUMMARY OF THE INVENTION

Lengthy tests with slide valves in accordance with the invention have shown that, even with pressure differences of $10^6$ Pa (10 bar) between the pressure-relieved connection of the source of pressure on the one side of the annular packing and the stream of solids which flows when the slide valve is open on the other side of the annular packing, no solids, not even very fine solid particles can pass by the annular packing and enter into the connection for the source of pressure.

In one advantageous embodiment, the vertex region of the support spring, which region is directed towards the closing surface of the closing member, rests, in supporting manner, against the inner circumference of the hollow space of the pressure-relieved, undeformed annular packing which is inserted in the slide-valve housing, and rests on all sides against its supporting walls.

The support spring is preferably a wound spiral spring which is pervious to the inflation fluid between its turns and is advantageously designed to take up a pressure acting on its circumference transverse to its longitudinal axis of up to about $5 \times 10^5$ to $10^6$ Pa (10 bar).

Furthermore, the annular packing is preferably developed as a circumferential groove of open cross section and is inserted into an annular groove of the slide-valve housing, in which it preferably lies free of adhesive.

BRIEF DESCRIPTION OF THE DRAWINGS

The invention will be explained below, by way of example, with reference to the drawing, in which.

DETAILED DESCRIPTION OF THE PREFERRED EMBODIMENT

Figure 1:
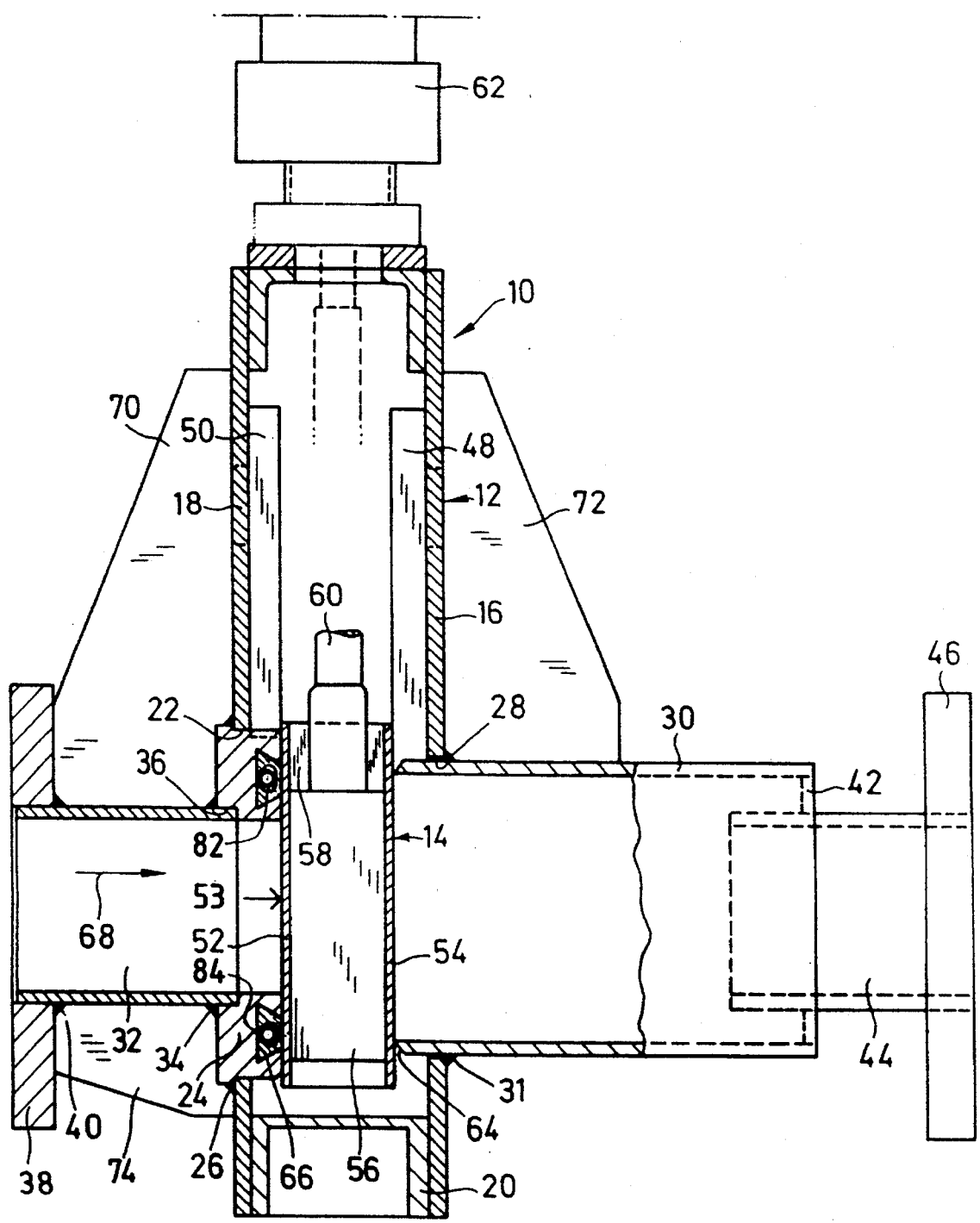
FIG. 1 is a longitudinal section through one embodiment of a slide valve.

FIG. 1 shows, in longitudinal direction, a slide valve 10 which is arranged within a pipeline (not shown). Gaseous or liquid fluids which contain a larger or smaller proportion of solids are transported through the pipeline. The slide valve 10 has a slide-valve housing 12 within which a closure member 14 is displaceable. The slide-valve housing 12 consists of sheet-metal plates 16 and 18 which are connected to each other by U-shaped sections 20 which extend around the edge. The sheet-metal plate 18 is provided with a circular cutout 22 into which a ring 24 is welded by a circumferential weld seam 26. The opposite plate 16 is provided with a circular cutout 28 into which a length of pipe 30 is fastened by a circumferential weld seam 31. A length of pipe 32 is fastened via a weld seam 34 to the ring 24. For this purpose, the ring 24 has a recess 36. On the end opposite the pipe 32, a flange 38 is welded onto the length of pipe 32 via a weld seam 40, the flange serving for attachment to a pipeline.

The length of pipe 30 is provided, on its end opposite the slide-valve housing 12, with a ring 42 into which there is inserted a length of pipe 44 the diameter of which corresponds to the diameter of the length of pipe 32. The end of the length of pipe 44 directed towards the slide-valve housing 12 extends into the length of pipe 30. On the opposite end of the length of pipe 44, there is fastened a flange 46 which serves for connection with an adjoining pipeline. The diameter of the length of pipe 30 is greater than that of the length of pipe 32 or 44.

On the inner side of the sheet-metal plates 16 and 18 there are guide ribs 48 and 50 respectively which serve for the guiding of the closure member 14. The closure member 14, which consists of two parallel plates 52 and 54 with spacers 56 and 58 arranged between them, is articulated to a rod 60 which is actuated via a hydraulic or pneumatic piston-cylinder unit 62. The outside of the closure-member plate 54 lies against the beveled inner end surface 64 of the length of pipe 30. On the outer side of the opposite closure-member plate 52, which forms a closing surface 53, there rests, when the slide valve is closed, a packing 66 which is developed as a pressure-loaded annular packing. The direction of flow of the solids-containing liquid or gaseous fluid is indicated by the arrow 68. FIG. 1 shows the slide valve in its closed position, i.e. the fluid to be transported is impounded in the length of pipe 32 in front of the closure-member plate 52, while behind the closure-member plate 54 no pressure of the fluid is present any longer in the lengths of pipe 30 and 44. In order to strengthen the connection between the slide-valve housing 12 and the lengths of pipe 32 and 30, reinforcement ribs 70, 72, 74 are provided.

Figure 2:
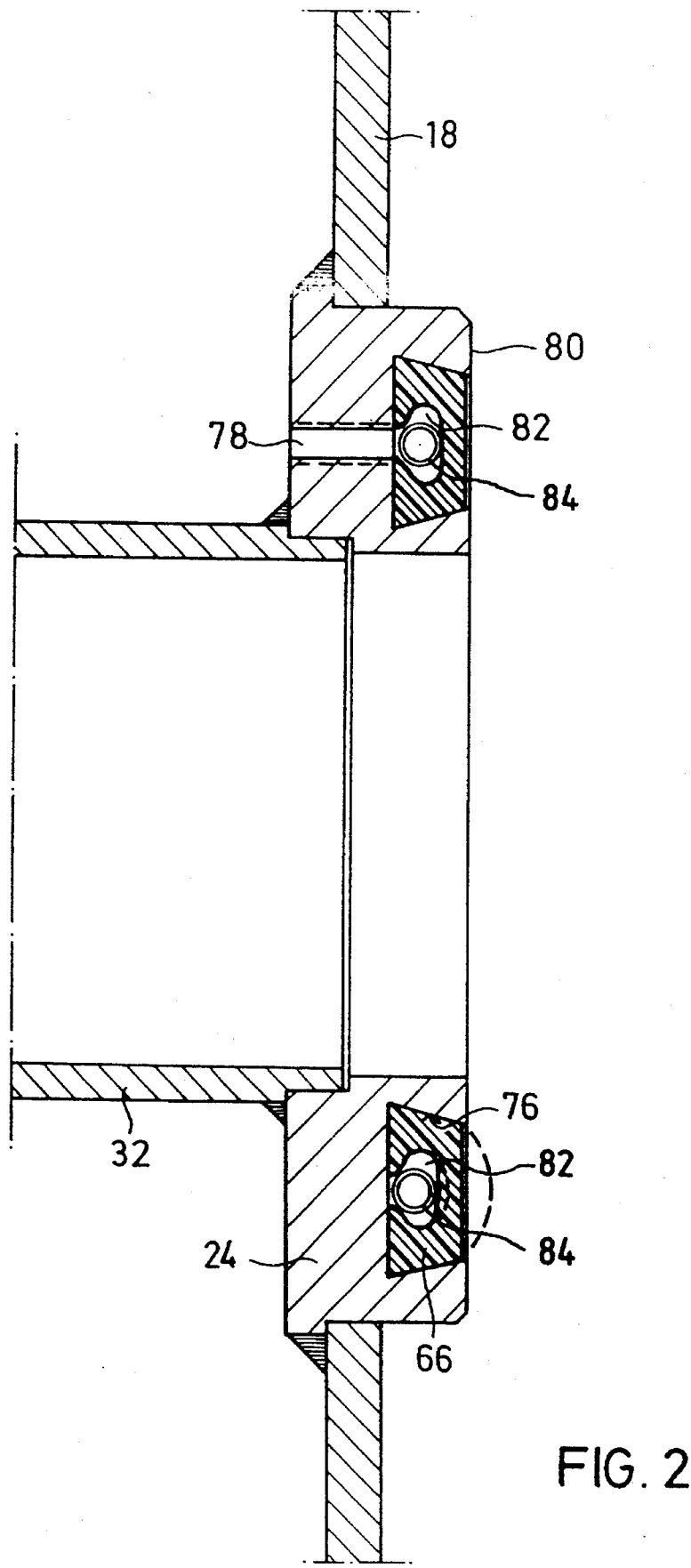
FIG. 2 shows, on a larger scale, the arrangement of a packing which can be acted on by pressure.

The development and manner of operation of the pressure-loadable seal can be noted from FIG. 2. The ring 24, in which the packing 66 is arranged, is formed with an undercut annular groove 76 on the side opposite the closure member 14. A rubber ring developed in cross section as an open circumferential groove, the outer contour of which is of dovetail shape, is bonded into the annular groove 76. The outer contour of the packing 66 corresponds to the free cross section of the annular groove 76. The annular groove 76 is in communication, via a passage hole 78, with a line (not shown) for a pressure fluid. As pressure fluid, a liquid or preferably compressed air can be used. When not acted upon, i.e. when no pressure fluid has been introduced into the annular groove 76 through the hole 78, the packing has a shape in which it does not protrude beyond the end surface 80 of the ring 24. As soon as compressed air, for instance, is introduced into the annular groove 76, and thus into the hollow space 82 of the packing 66, the packing 66 expands outward and, since the possibility of expansion exists merely out beyond the end surface 80, the packing assumes an outwardly curved shape, as indicated in the lower part of FIG. 2. In this condition, the packing presses against the closing surface 53 of the closure-member plate 52, as a result of which, supported by the pressure prevailing in the length of pipe 68, the closure member 14 presses against the end surface 64 of the length of pipe 30. By the pressure-loaded packing 66, assurance is had that the line adjoining the length of pipe 32 is tightly closed off from the line adjoining the length of pipe 44.

A supporting spring which is developed as a wound spiral spring 84 which allows the inflation fluid to pass between its turns is inserted into the hollow space 82 of the annular packing 66. In the embodiment shown, the spiral spring 84 has been wound from high-strength spring steel of a wire thickness of about 1 mm, a pitch of about 1.5 mm, and a space between adjacent turns of about 0.5 mm, in order to be able to take up pressures of an amount of up to about $10^6$ Pa (10 bar) acting on its circumference transverse to its longitudinal axis. As shown in FIG. 2, the spiral spring 84 need not rest with its entire outer circumference against the entire inner circumference of the annular packing 66. It is sufficient for the vertex region of the spiral spring 84 which is directed towards the closure surface 53 of the closure member 14 to rest in supporting manner against the inner circumference of the hollow space 82 of the annular packing 66 which is inserted into the slide-valve housing 12—namely, in a condition of the annular packing 66, when the packing 66 rests, relieved of pressure, against its supporting walls on all sides and is not deformed (i.e. the packing 66 assumes the shape intended for the pressure-less condition.)

Figure 3:
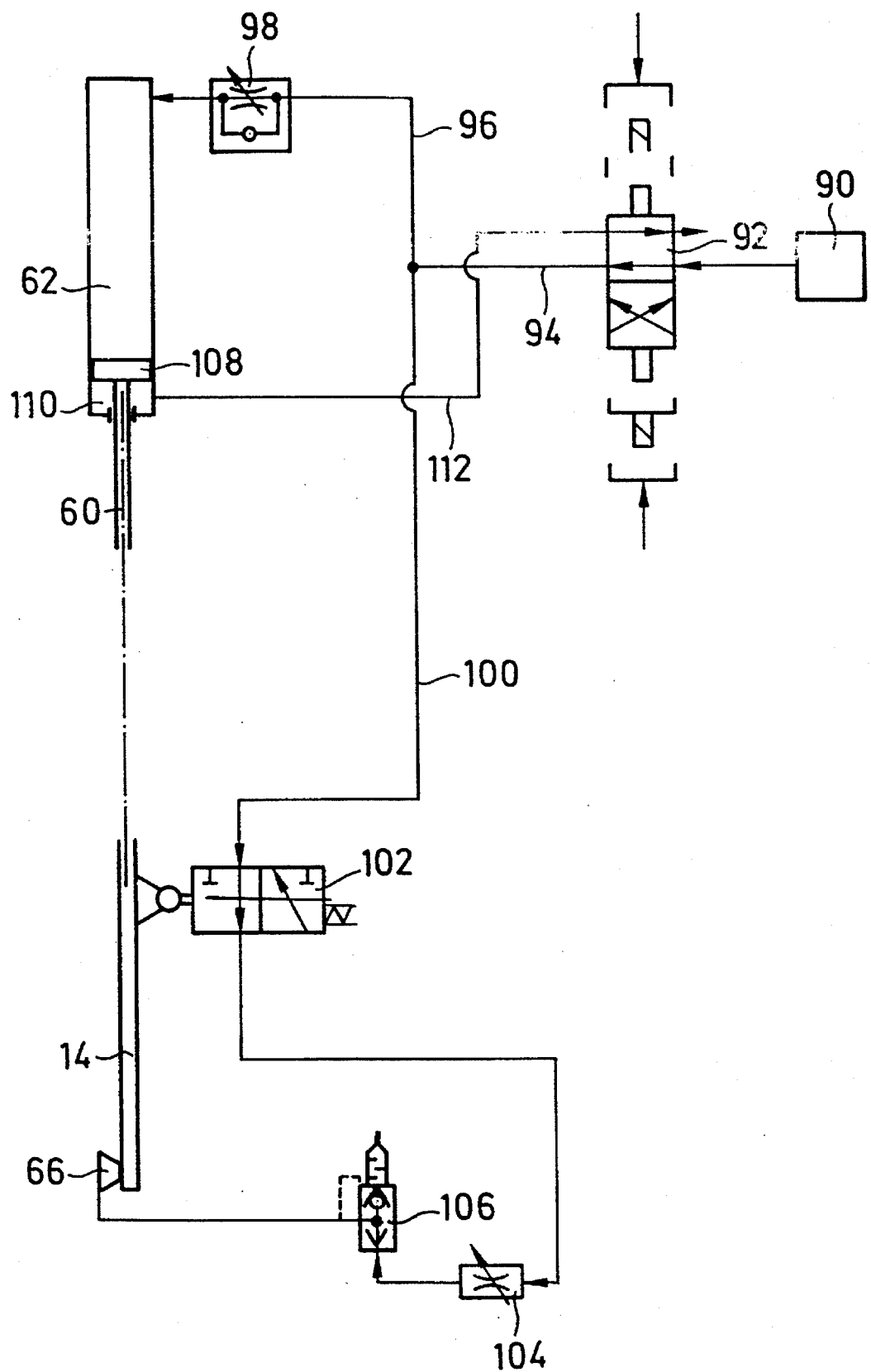
FIG. 3 is a diagram of a slide valve control.

FIG. 3 shows diagrammatically a pneumatic control of the pressure slide valve shown in FIGS. 1 and 2. From a source of compressed air 90, compressed air is fed via a 4/2-way valve 92, which can be operated manually, pneumatically or electrically, into a line 94 which branches into a line 96. The line 96 leads, via a throttle non-return valve 98, to the pneumatic piston-cylinder unit 62. The line 96 also leads into a line 100 which leads, via a mechanically actuatable 3/2-way valve 102 and via a throttle valve 104 to the pressure-loadable packing 66. Between the throttle valve 104 and the packing 66 there is a rapid vent valve 106 via which the packing 66 is relieved of pressure upon the opening of the closure member 14. As soon as compressed air is fed via the valve 92, the piston 108 of the piston-cylinder unit 62 is moved downward, as a result of which the closure member 14 is brought into the closing position. As soon as the closing member 14 has reached its closing position, compressed air is conducted into the packing 66 via the valve 102 so that the packing is inflated and applies itself in sealing manner against the side surface of the closure member 14. During the displacement of the piston 108 into the closing position, venting of the cylinder chamber 110 located in front of the piston takes place via a line 112. When the slide valve is to open, compressed air is introduced into the cylinder chamber 110 via line 112 by switching of the valve 92 so that the piston 108 can move upward, carrying the closing member 14 along with it.

Upon the start of the opening process, the line 94 is relieved of pressure and the cylinder chamber 110 is placed under pressure. A certain pressure must be built up by the installed throttle valve 98 before the piston 108 moves. This time delay is sufficient to relieve the packing 66, via the quick valve 106, so that no rubbing against the packing 66 takes place upon the movement of the closure member 14 into the open position.

I claim:

1. A slide valve for pipelines transporting solid-laden gaseous or liquid fluids, comprising:

a slide-valve housing (12) having a fluid passage therethrough;

a closure member (14) displaceably mounted in the housing (12) for movement between a closed position where said closure member (14) closes the fluid passage and an open position where the closure member (14) opens the fluid passage;

an inflatable annular packing (66) mounted in the housing (12) and surrounding said fluid passage, said annular packing having a circumferential hollow space (82) therein to receive fluid under pressure for selectively inflating and deflating said inflatable annular packing (66), said annular packing (66) being dimensioned to engage said closure member (14) in an inflated condition and to be spaced from said closure member (14) in an uninflated condition;

a source of fluid pressure (78) in communication with the circumferential hollow space (82) of the annular packing (66);

valve means (106) in communication with the source of fluid pressure (78) for directing fluid under pressure to said circumferential hollow space (82) when said closure member (14) is in the closed position for inflating the annular packing (66) against the closure member (14), and for releasing the fluid under pressure from said circumferential hollow space (82) prior to opening the closure member; and a wound spiral spring (84) formed into an annular shape and disposed in the circumferential hollow space (82) of the annular packing (66), said wound spiral spring (84) being pervious between its spiral turns to the fluid from the source of fluid pressure, said wound spiral spring (84) being dimensioned for supporting the annular packing (66) when the pressure is released from the circumferential hollow space (82) and for being in non-supporting relationship to inflated portions of said annular packing (66) when the pressure directed to the circumferential hollow space (82) inflates said annular packing (66).

2. A slide valve according to claim 1, characterized by the fact that the spiral spring (84) is design to receive a pressure of up to about $5 \times 10^5$ to $10^6$ Pa (10 bar) acting on its periphery transverse to its longitudinal axis.

3. A slide valve according to claim 1, characterized by the fact that the spiral spring (84) has a wire thickness of between about 0.5 and 1.5 mm, a pitch of between about 0.8 and 2.5 mm, and a distance between adjacent wires of about 0.3 to 1 mm.

4. A slide valve according to claim 3, characterized by the fact that the thickness of the wire is about 1 mm, the pitch is about 1.5 mm and the distance is about 0.5 mm.

5. A slide valve according to claim 1, characterized by the fact that the annular packing (66) is arranged in the slide-valve housing (12) in front of the closure member (14) as seen in the direction of flow.

6. A slide valve according to claim 1, characterized by the fact that the annular packing (66) is formed as a circumferential groove of open cross section and is inserted into an annular groove (76) of the slide-valve housing (12).

7. A slide valve according to claim 6, characterized by the fact that the annular packing (66) lies free of adhesive within the annular groove (76).

8. A slide valve according to claim 6, characterized by the fact that the annular groove (76) is undercut and the outer contour of the annular packing (66) is developed correspondingly in dovetail shape.

9. A slide valve according to claim 6, characterized by the fact that the annular groove (76) has a passage hole (78) as connection for a source of pressure (90).

\* \* \* \* \*